United States Patent
Warnke et al.

(10) Patent No.: US 6,793,601 B1
(45) Date of Patent: Sep. 21, 2004

(54) 1-2 SHIFT VALVE ASSEMBLY

(75) Inventors: Robert C. Warnke, Spooner, WI (US); Benjamin A. Wallace, Saxtons River, VT (US)

(73) Assignee: Sonnax Industries, Inc., Bellows Falls, VT (US)

(*) Notice: Subject to any disclaimer, the term of this patent is extended or adjusted under 35 U.S.C. 154(b) by 0 days.

(21) Appl. No.: 10/269,719

(22) Filed: Oct. 11, 2002

Related U.S. Application Data

(60) Provisional application No. 60/329,492, filed on Oct. 15, 2001.

(51) Int. Cl.[7] .......................... F16H 31/00; F16K 43/00; F16K 51/00; F16K 25/00
(52) U.S. Cl. ................. 475/122; 137/454.2; 137/315.11
(58) Field of Search .......................... 475/122, 99, 116, 475/119; 137/454.2, 315.11, 315.27, 454.6

(56) References Cited

U.S. PATENT DOCUMENTS

| | | | | |
|---|---|---|---|---|
| 4,462,278 A | * | 7/1984 | Murakami et al. | 475/123 |
| 4,484,655 A | * | 11/1984 | Sheppard, Sr. | 180/308 |
| 4,633,739 A | * | 1/1987 | Ogasawara et al. | 477/148 |
| 5,669,761 A | * | 9/1997 | Kobayashi | 417/302 |
| 6,076,552 A | * | 6/2000 | Takahashi et al. | 137/625.3 |
| 6,634,377 B1 | * | 10/2003 | Stafford | 137/454.2 |

OTHER PUBLICATIONS

"Contributions to Hydraulic Control: Steady–State Axial Forces on Control–Valve Pistons" by Shih–Ying Lee and J.F. Blackburn, Transactions of the ASME, pp. 1005–1011, Aug., 1952.
CFD Simulation of Steady–State Flow Forces on SpoolType Hydraulic Valves by R. Miller, Y. Fujii, J. McCallum, G. Strumulo, W. Tobler, and C. Pritts, Ford Motor Co., Society of Automotive Engineers, Inc. 1999.

* cited by examiner

Primary Examiner—Tisha D. Lewis
(74) Attorney, Agent, or Firm—Clifford F. Rey

(57) ABSTRACT

A replacement 1-2 shift valve for an automatic transmission, which restores a smooth shift from first to second gear thereby correcting a shudder shift or a complete failure to shift from first to second gear is disclosed. The present 1-2 shift valve comprises a valve piston including at least one bi-directionally tapered valve stem that changes the direction of transmission fluid flow within the valve such that a rebound force is generated which acts to propel the valve piston in an axial direction toward the second gear position of the valve. The piston lands which comprise the valve piston are provided with a plurality of annular grooves that function to retain transmission fluid and to center the valve piston in its mating bore to resist to side loading during operation. In addition, the present valve piston is provided with an anodized surface finish, which increases service longevity.

21 Claims, 5 Drawing Sheets

1-2 SHIFT VALVE ASSEMBLY

CROSS-REFERENCE TO RELATED APPLICATION

This patent application claims the benefit under 35 U.S.C. 119(e) of U.S. Provisional Patent Application No. 60/329,492 filed Oct. 5, 2001, entitled Improved 1-2 Shift Valve.

BACKGROUND OF INVENTION

The present invention relates generally to the field of hydraulic circuits utilized in automatic transmission systems and, more particularly, to a direct replacement valve mechanism for a 1-2 Shift Valve that regulates hydraulic fluid pressure within the valve body to affect proper shifting of the transmission from first to second gear.

Automatic transmission systems of the prior art have a hydraulic circuit sub-system which includes at least a hydraulic pump, a valve body having fluid conducting passages or circuits, input and exhaust ports formed within the fluid circuits, and a plurality of spool valves so-called because of their resemblance to sewing thread type spools. Such valves are comprised of cylindrical pistons having a plurality of piston lands formed thereon, which alternately open and close the ports to regulate the flow and pressure of automatic transmission fluid (hereinafter "ATF") within the hydraulic circuits to actuate different components of the transmission. It will be understood that in describing such hydraulic circuits, ATF usually changes names when it passes through an orifice or control valve in a specific circuit.

The so-called 1-2 Shift Valve regulates proper gear shifting from first to second gear in automatic transmissions such as the General Motors 4T60E transmission and other similar automatic transmissions made available on General Motors vehicles. The original equipment manufacture (hereinafter "OEM") 1-2 Shift Valve on such transmissions is fabricated from a low grade aluminum material, which is subject to premature wear and scoring. Further, the OEM valve also has a large reaction area and is highly affected by side loading (i.e. vertical movement) caused by ATF entering the valve under pressure, which wears the mating bore prematurely.

As the wear increases the OEM valve tends to stick and/or eventually seize in the bore during its reciprocating movement from the first gear to the second gear position due to mechanical friction between the worn surfaces of the valve piston and the mating bore. This produces a characteristic shift problem in the General Motors 4T60E transmission wherein the second gear clutch slips or "shudders" and may completely prevent a shift to second gear.

Thus, the present invention has been developed to resolve this problem and other shortcomings of the prior art.

DESCRIPTION OF RELATED PRIOR ART

The theory of forces exerted upon a hydraulic piston by fluid flowing past it has been the subject of considerable scholarly study, which has been applied to practical valve piston construction in the prior art. One example of such a study appears in the article, "Contributions to Hydraulic Control" by Lee and Blackburn, *Transactions of the ASME*, August, 1952, in which a theory is given of the origin of the steady-state force exerted upon a piston by fluid flowing past its corner. In this article reference is made to a considerable body of experimental evidence in support of that theory.

Another such example is disclosed in the article, "CFD Simulation of Steady-State Flow Forces on Spool-Type Hydraulic Valves" by Miller et al., *Society of Automotive Engineers*, 1999, which describes a new methodology for determining the steady-state flow force on a hydraulic flow valve.

However, these prior art references do not teach or suggest the combination of structural features and functional aspects of the present invention.

SUMMARY OF THE INVENTION

Accordingly, the present invention is a direct replacement 1-2 Shift Valve for the GM 4T60E transmission, which restores a smooth 1-2 gear shift thereby correcting the "shudder" shift or complete failure to shift from first to second gear, which is a common service complaint among owners of a vehicle with this transmission.

The present 1-2 Shift Valve includes at least one bi-directionally tapered valve stem having fluid deflecting and/or redirecting surfaces that change the direction of transmission fluid flow upon ingress of fluid into the valve such that a rebound force is generated by the fluid's impact with the defelecting surfaces, which acts to propel the valve piston in an axial direction to facilitate the shift from first to second gear.

In addition, the so-called spools or piston lands, which comprise the valve piston are provided with a plurality of annular grooves that function to retain a layer of ATF bout the circumference of the valve piston to buffer it against side loading (i.e. lateral movement) within the mating bore during operation. Further, the present valve piston is provided in an anodized aluminum finish, which reduces surface friction and increases service longevity.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

With further reference to the drawings there is shown therein a 1-2 shift valve of the Prior Art, indicated generally at 100. The OEM 1-2 shift valve 100 is shown in exploded view and removed from its functional position within mating bore 105, which is machined into the valve body, indicated generally at 110 of the General Motors 4T60E transmission (hereinafter "GM transmission").

Figure 1:
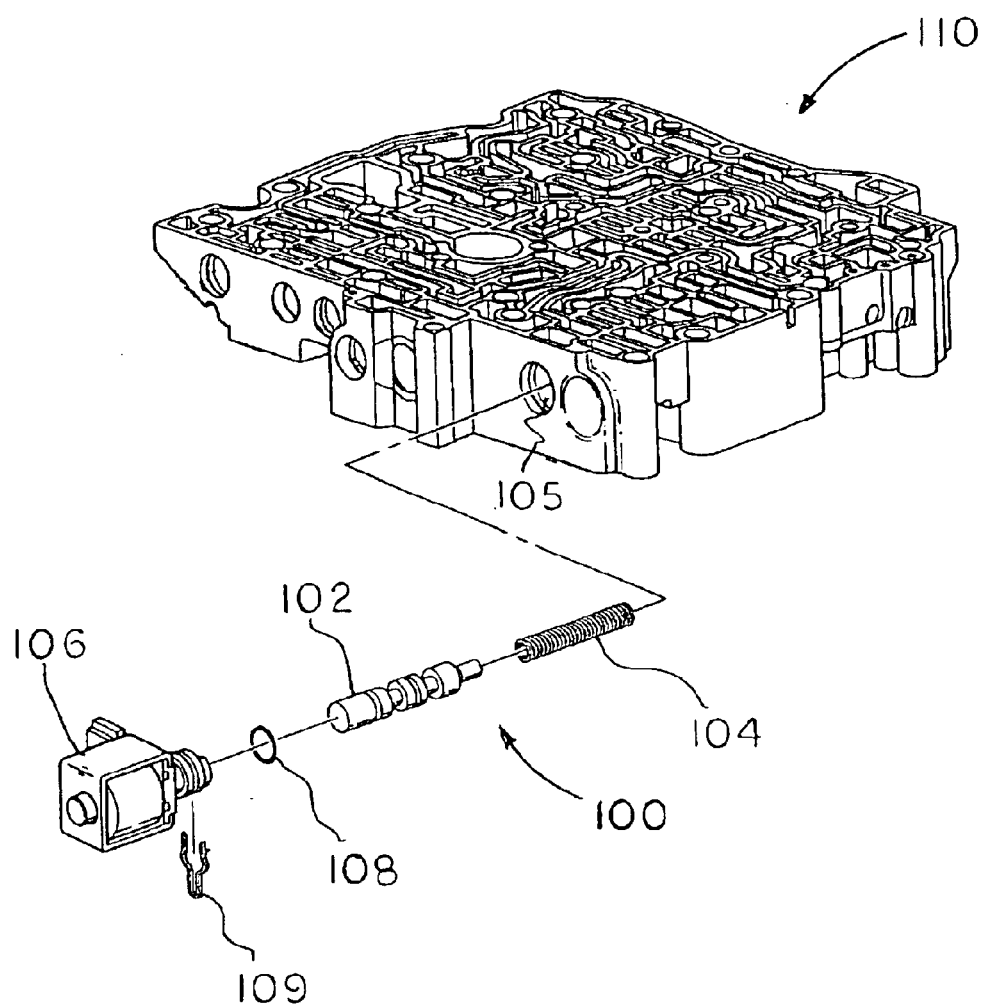
FIG. 1 is a perspective view of the OEM valve body of a General Motors 4T60E transmission labeled Prior Art showing the location of the 1-2 shift valve shown in exploded view.
Figure 2:
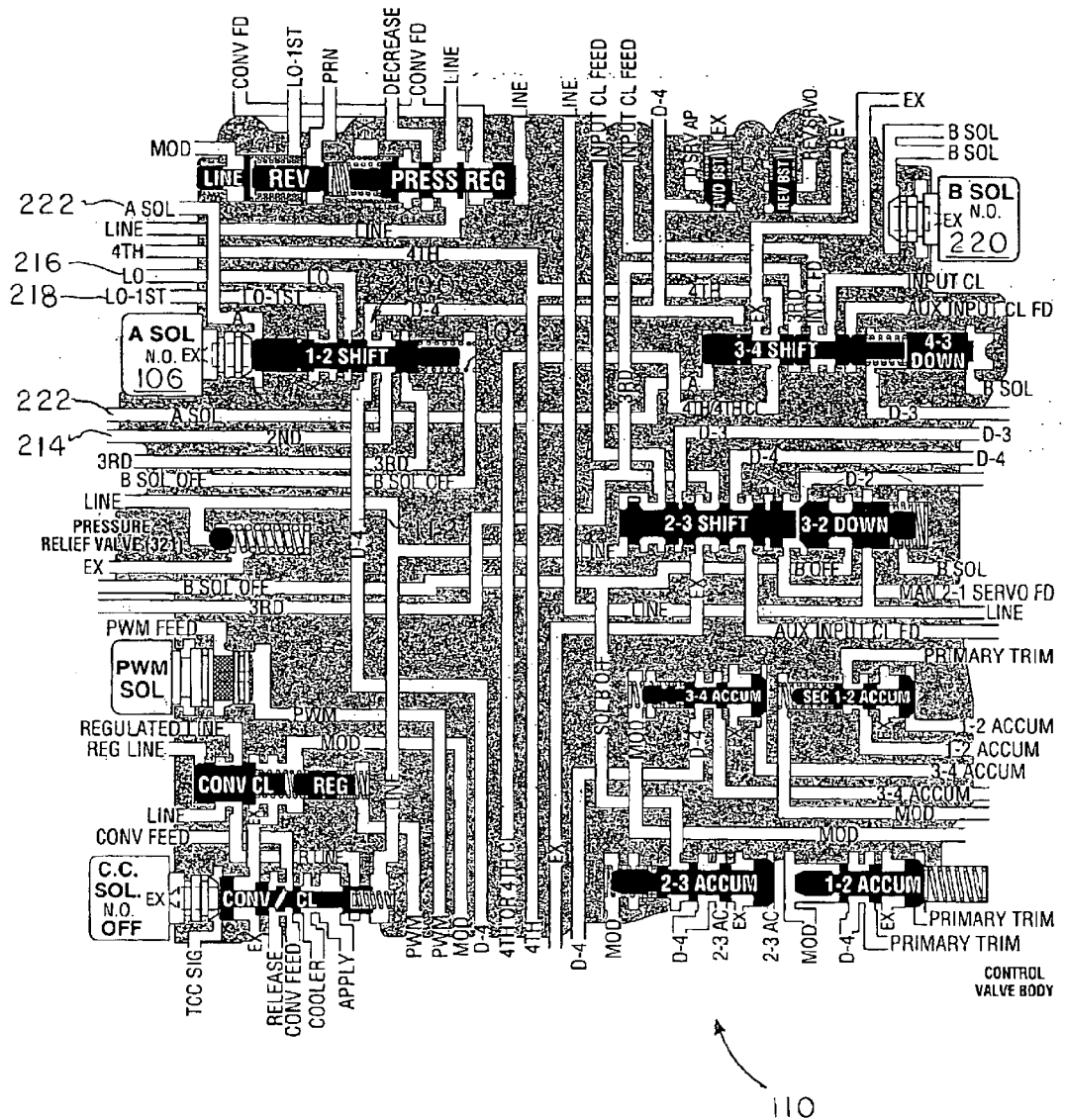
FIG. 2 is a schematic diagram of the hydraulic fluid circuits within the valve body of the General Motors 4T60E transmission labeled Prior Art.

In the GM transmission 1-2 shift valve 100 is a spool-type valve including a generally cylindrical piston 102 having a plurality of concentric control diameters or spools and a compression spring 104 arranged coaxially for installation with the bore 105 as shown. The shift solenoid "A" 106, a mating O-ring seal 108, and retaining clip 109 are included in the 1-2 shift valve circuit and illustrated for reference purposes More particularly, the shift solenoid "A" 106 is an ON/OFF type solenoid that receives its voltage supply through the ignition switch (not shown). The Powertrain Control Module (hereinafter "PCM") controls the shift solenoid "A" 106 by providing a ground to energize it in: Park, Neutral, Overdrive Range, First gear, Fourth gear, and also Manual First gear. When energized, its corresponding exhaust port closes actuating the 1-2 shift valve 100 and allowing filtered line pressure to enter the solenoid "A" fluid circuit 222 (FIG. 2). When the PCM (not shown) removes the ground, the shift solenoid "A" is turned OFF allowing line pressure to exhaust through the solenoid "A" and the valve piston 102 returns to the rest position shown in FIG. 2.

FIG. 2 shows the ATF circuits in the valve body 110 of the GM transmission schematically. It will be appreciated that the 1-2 shift valve 100 responds to solenoid "A" 106 ON-fluid pressure, to force from the compression spring 104, and also to solenoid "B" 220 OFF-fluid pressure. Depending on the position of the 1-2 shift valve 100, it will route Lo circuit fluid as at 216 into the Lo-$1^{st}$ fluid circuit at 218 or D-4 circuit fluid as at 112 into the $2^{nd}$ gear fluid circuit at 214.

Figure 3A:
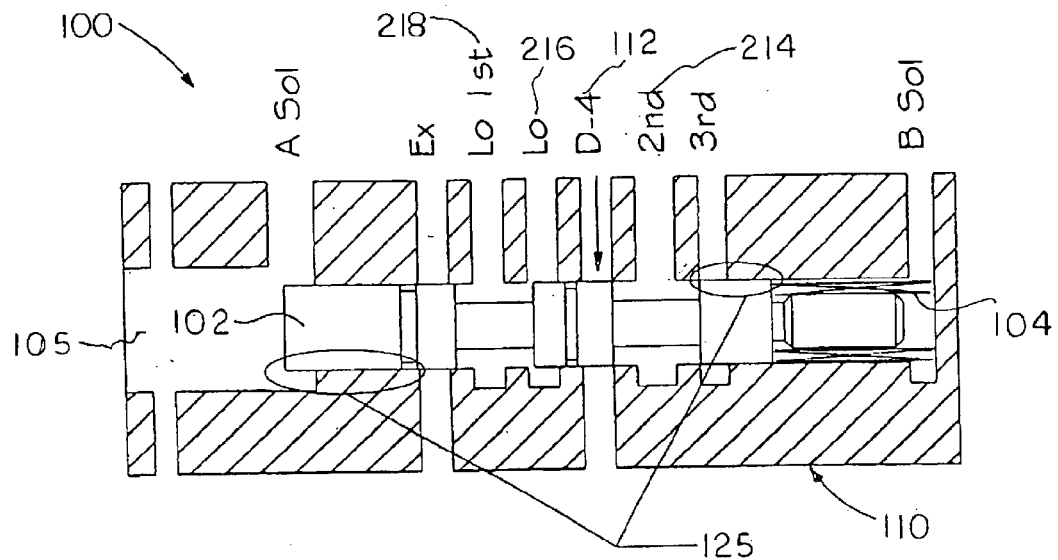
FIG. 3A is a partial section view of the OEM valve body labeled Prior Art showing the position of the OEM 1-2 shift valve in $1^{st}$ gear with the Solenoid "A" in the ON state.
Figure 3B:
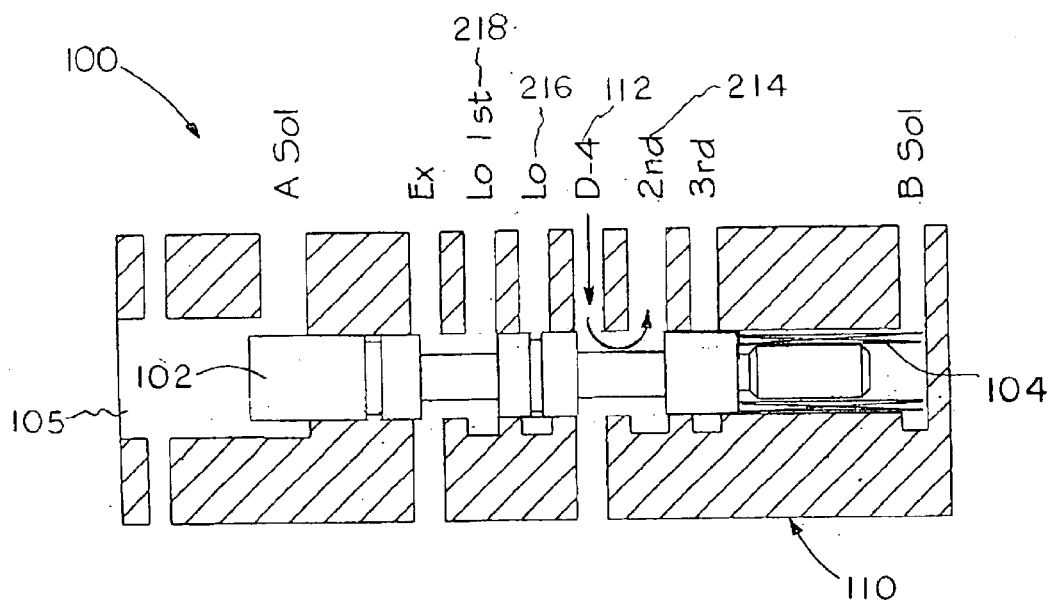
FIG. 3B is a partial section view of the OEM valve body labeled Prior Art showing the position of the OEM 1-2 shift valve in $2^{nd}$ gear with the Solenoid "A" in the OFF state.

As more clearly shown in FIG. 3A, solenoid "A" is in the ON state in $1^{st}$ gear and the 1-2 shift valve 100 is stroked against the force of spring 104 blocking D-4 circuit pressure from entering the $2^{nd}$ gear clutch circuit at 214. In second gear solenoid "A" is turned OFF and the valve 100 returns to the rest position shown in FIG. 3B allowing D-4 fluid pressure to apply the $2^{nd}$ gear clutch.

This reciprocating movement of the valve 100 and its susceptibility to side loading causes characteristic wear spots on the O.D. surfaces of the spools as at 125 (FIG. 3A) and on the mating surfaces of the bore 105. This results in scoring and/or eventual seizing of the valve piston 102 in the bore 105 on the return stroke to the rest position producing the socalled "shudder" shift problem and/or a complete failure to shift to second gear as described hereinabove. Thus, the present replacement 1-2 Shift Valve has been developed to solve this problem and will now be described.

Figure 4:
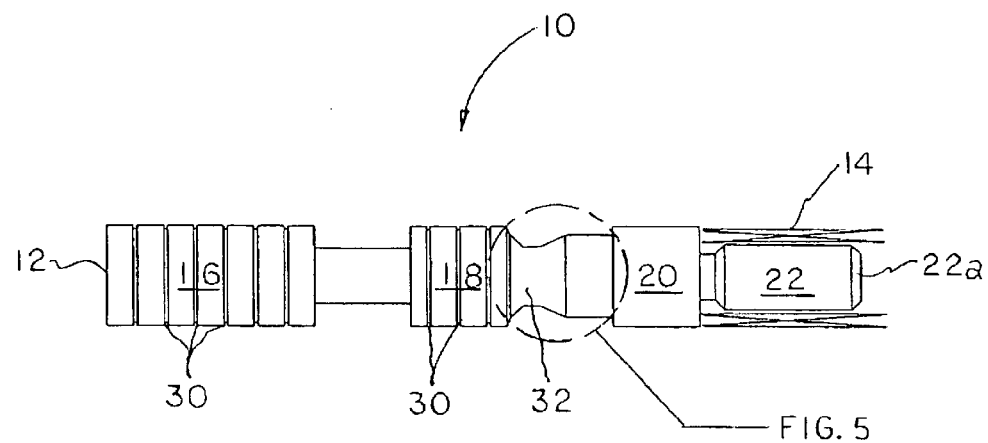
FIG. 4 is an elevational view of the 1-2 Shift Valve of the present invention showing details of the construction thereof.

Referring now to FIG. 4, there is shown therein a direct replacement 1-2 Shift Valve Assembly in accordance with the present invention, indicated generally at 10. The present 1-2 Shift Valve Assembly 10 is also a spool-type valve mechanism comprised of a valve piston, indicated generally at 12, and a compression spring 14 arranged as shown. In one embodiment the valve piston 12 is constructed of a high grade 6262-T8/T9 or 6061-T6 aluminum or other suitable material for this application.

The valve piston 12 is also provided with a hard anodized coating to yield 0.0008 +/−0.0004 inches build up per surface in accordance with MIL-A-8625, Type III, Class 2, for improved wear resistance and increased service longevity.

The present valve piston 12 is constructed with a plurality of so-called spools or piston lands, namely a primary spool 16, a secondary spool 18, and a tertiary spool 20 which function to regulate the flow of ATF within the fluid circuits of the valve body 110 (FIG. 2). The valve piston 12 also includes a spring guide diameter 22 of sufficient size to support the compression spring 14 in the position shown in FIG. 4. The terminal end 22a of spring guide diameter 22 is chamfered to avoid entanglement with spring 14 during installation. An opposite end of spring guide diameter 22 is integrally connected to spool 20, which functions as a seating surface for spring 14 on a first end face thereof.

Compression spring 14 is manufactured from a suitable material such as spring wire in accordance with commercial specifications to provide a specific spring rate and desired operating characteristics for this application.

Still referring to FIG. 4 it can be seen that primary and secondary spools 16, 18 respectively are provided with a plurality of annular grooves 30 formed about the circumference thereof to a predetermined depth. In one embodiment, among others, primary spool 16 includes a set of six grooves 30 formed thereon and secondary spool 18 includes a set of three grooves. The annular grooves 30 function to distribute fluid pressure across the circumference of spools 16, 18 by filling with ATF during operation thereby centering the valve piston 12 within the bore 105 and buffering it against side loading (i.e. lateral movement). The axial length of primary and secondary spools 16, 18 has also been increased in comparison to the OEM design to maximize the axial spacing of the grooves 30 to further stabilize the valve piston 12 during operation.

The present 1-2 Shift Valve 10 also incorporates features comprising fluid deflecting and/or redirecting means including, but not limited to, the following structures. As most clearly shown in FIG. 5, the valve piston 12 includes at least one bi-directionally tapered stem 32, which integrally connects the secondary spool 18 to the adjacent tertiary spool 20. Stem 32 includes a radius "R" formed at a predetermined axial distance "X" from an adjacent end face of tertiary spool 20 as shown. In one embodiment radius "R" is in the range of 0.090–0.100 inches. The radius "R" is blended with angled ramp segments 32a, 32b, which are formed at predetermined angles "A" and "B" respectively to the longitudinal axis of the valve piston 12 as shown. In one embodiment, among others, angle "A" is in the range of 65–75 degrees and angle "B" is in the range of 20–30 degrees.

Figure 6A:
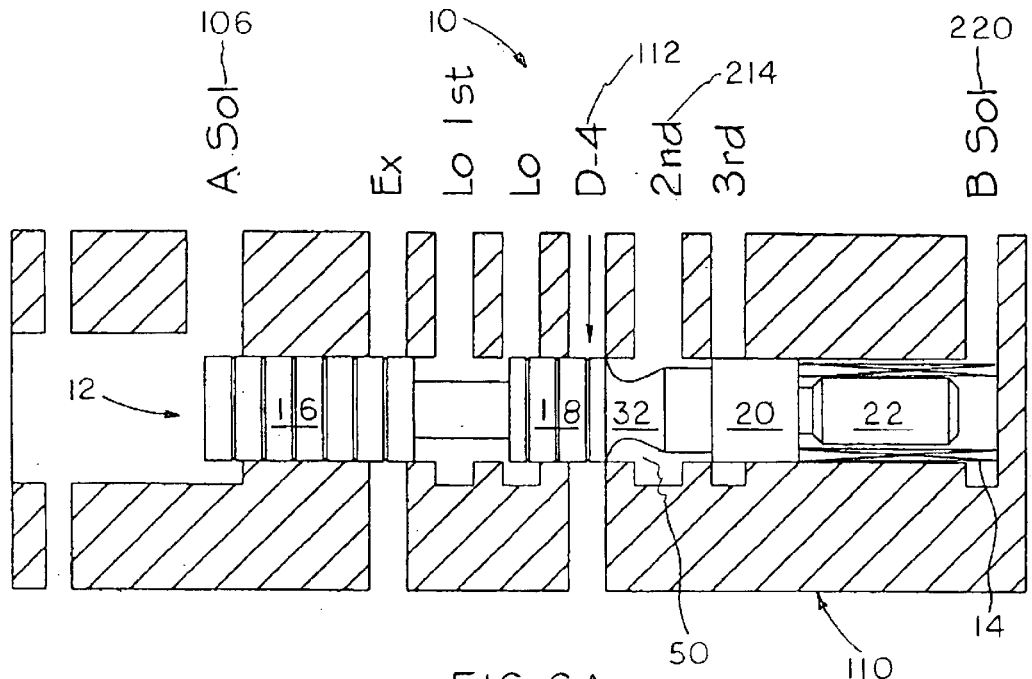
FIG. 6A is a partial section view of the OEM valve body showing the position of the present 1-2 Shift Valve in $1^{st}$ gear with the Solenoid "A" in the ON state.
Figure 6B:
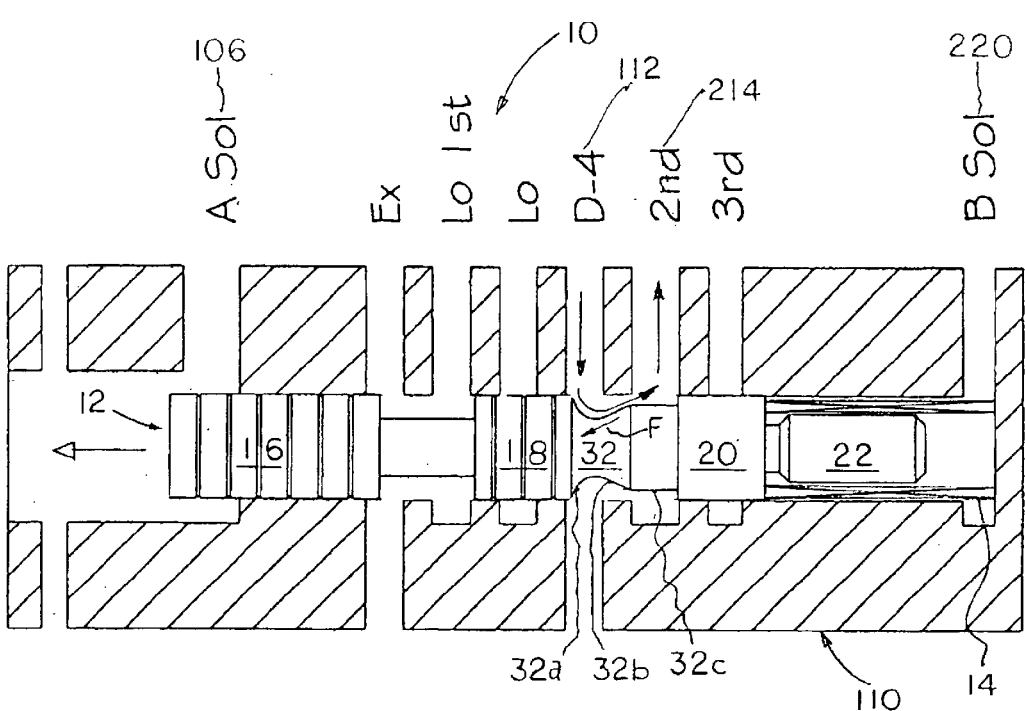
FIG. 6B is a partial section of the OEM valve body showing the position of the present 1-2 Shift Valve in $2^{nd}$ gear with the Solenoid "A" in the OFF state.

Stem 32 is configured in this manner to take advantage of the force of ATF under line pressure (105–125 psi) as it enters the valve chamber 50 from the D-4 fluid circuit 112 as illustrated in FIGS. 6A and 6B. More particularly, in first gear solenoid "A" is ON and the piston 12 is stroked to the position shown in FIG. 6A against the force of the spring 14 such that spool 18 is blocking the D-4 circuit 112. When the shift to $2^{nd}$ gear is commanded by the PCM, the solenoid "A" is turned OFF and the piston 12 begins the return stroke to the rest position shown in FIG. 6B.

ATF entering the valve chamber 50 flows under line pressure over the ramp segment 32a and is deflected off the radius "R" of the stem 32 and changes direction flowing over the ramp segment 32b and relief diameter 32c into the $2^{nd}$ gear circuit 214. It will be appreciated that the rebound effect created by the impact of ATF being deflected off of the radius "R" and into the $2^{nd}$ gear circuit 214 generates a reaction force "F" resultant from the change in ATF flow direction as indicated by directional arrow "F", which is exerted on the valve piston 12. This force "F" in combination with force of the released spring 14 propels the valve piston 12 axially toward the rest position as shown by directional arrow 55 in FIG. 6B.

Figure 5:
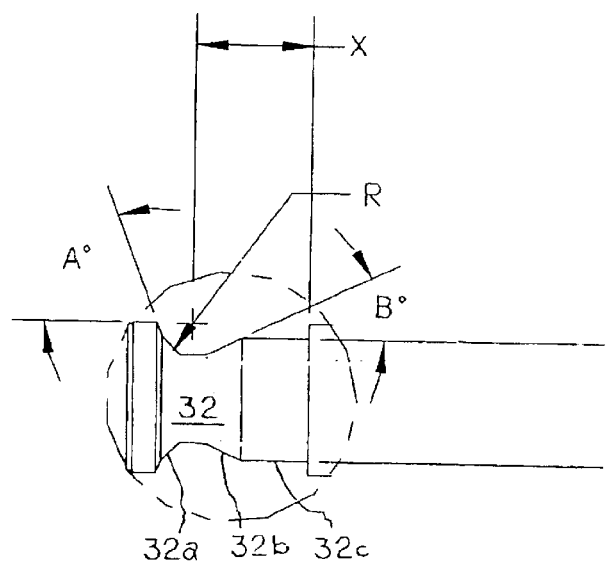
FIG. 5 is an enlarged elevational view of the contoured valve stem showing further details thereof.

It will also be noted that relief diameter 32c provides less resistance to the flow of fluid into the $2^{nd}$ gear circuit 214 by eliminating the end face of tertiary spool 20 at the juncture of the angled ramp segment 32b as most clearly shown in FIG. 5. This improves the efficiency of the valve 10 during the shift to $2^{nd}$ gear.

Thus, it can be seen that the present invention provides a direct replacement 1-2 Shift Valve 10 that is resistant to side loading and substantially reduces wear. Further, the bi-directional, tapered geometry of the contoured stem 32 takes advantage of the force of ATF flowing within the present valve 10 to provide a smoother, more efficient shift from first to second gear thereby eliminating the 1-2 "shudder" shift problem common to the 4T60E transmission.

Although not specifically illustrated in the drawings, it should be understood that additional equipment and structural components will be provided as necessary and that all of the components described above are arranged and supported in an appropriate fashion to form a complete and operative 1-2 Shift Valve incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. An improved first to second gear shift valve piston for installation in the valve body of an automatic transmission, said valve piston including primary, secondary and tertiary spool diameters interconnected by coaxial valve stems, said spool diameters being formed at axial intervals for diverting transmission fluid into fluid circuits within the valve body in a predetermined sequence based upon the position of said valve piston to complete a shift from first to second gear, wherein the improvement comprises:

fluid redirecting means including first and second angled ramp segments integrally formed at predetermined angles to a longitudinal axis of at least one of said valve stems, said first angled ramp segment being formed in the range of 65 to 75 degrees and said second angled ramp segment being formed in the range of 25 to 35 degrees, said fluid redirecting means changing the direction of fluid flow upon ingress of fluid into a valve chamber such that a rebound force is generated by the impact of the fluid with said fluid redirecting means, said rebound force acting to propel said valve piston in an axial direction.

2. An improved shift valve of claim 1 wherein said first and second angled ramp segments are blended with a radius in the range of 0.090 to 0.100 inches.

3. An improved shift valve of claim 2 wherein said radius is centered at a predetermined axial distance from an end face of said tertiary spool diameter and is formed to a predetermined radial dimension.

4. An improved shift valve of claim 1 wherein said primary and said secondary spool diameters each include a plurality of annular grooves formed thereon to a predetermined depth for retaining transmission fluid to buffer said valve piston against side loading during operation.

5. An improved shift valve of claim 4 wherein said primary spool diameter includes six annular grooves and said secondary spool diameter includes three annular grooves.

6. An improved shift valve of claim 1 wherein said tertiary spool diameter includes a relief diameter formed thereon at its juncture with said second angled ramp segment to reduce resistance to fluid flow into the second gear fluid circuit.

7. An improved shift valve of claim 1 wherein said valve piston is provided with an anodized surface finish in accordance with MIL-A-8625, Type III, Class 2 to reduce surface friction.

8. A first to second gear shift valve assembly for installation in the valve body of an automatic transmission comprising:

a valve piston having a primary, a secondary and a tertiary spool diameter, wherein said spool diameters are integrally connected by concentric valve stems, said spool diameters functioning to divert transmission fluid into fluid circuits within the valve body in a predetermined sequence to affect shifting from first to second gear;

a compression spring disposed in concentric relation to said valve piston, said spring abutting said tertiary spool diameter to spring bias said valve piston to the second gear position; and fluid deflecting means including a bi-directionally tapered valve stem extending between said secondary and said tertiary spool diameters, said tapered valve stem comprising first and second angled ramp segments formed at predetermined angles to the longitudinal axis of said valve stem, said first angled ramp segment being formed in the range of 65 to 75 degrees and said second angled ramp segment being formed in the range of 25 to 35 degrees, said fluid deflecting means changing the direction of fluid flow upon ingress of fluid into a valve chamber such that a rebound force is generated by the impact of said fluid with said fluid deflecting means that acts to propel said valve piston in an axial direction toward the second gear position.

9. A shift valve assembly of claim 8 wherein said first and second angled ramp segments are blended with a radius in the range of 0.090 to 0.100 inches.

10. A shift valve assembly of claim 9 wherein said radius is centered at a predetermined axial distance from the adjacent end face of said tertiary spool diameter and is formed to a predetermined radial dimension.

11. A shift valve assembly of claim 8 wherein said primary and said secondary spool diameters each include a plurality of annular grooves formed thereon to a predetermined depth for buffering said valve piston against side loading in operation.

12. A shift valve assembly of claim 11 wherein said primary spool diameter includes six annular grooves and said secondary spool diameter includes three annular grooves.

13. A shift valve assembly of claim 8 wherein said tertiary spool diameter includes a relief diameter formed thereon at its juncture with said second angled ramp segment to reduce resistance to fluid flow into a second gear circuit.

14. A shift valve assembly of claim 8 wherein said valve piston is provided with an anodized finish in accordance with MIL-A-8625, Type III, Class 2 to increase service longevity.

15. An improved valve body for an automatic transmission, said valve body defining a plurality of hydraulic fluid circuits for delivering hydraulic fluid to a plurality of control valve pistons disposed therein, wherein the improvement comprises:

- at least one valve piston having a primary, a secondary and a tertiary piston land, wherein said piston lands are integrally connected by concentric valve stems, said piston lands functioning to divert transmission fluid into the fluid circuits within said valve body in a predetermined sequence to affect shifting from first to second gear; and
- fluid redirecting means including a bi-directionally tapered valve stem extending between said secondary and said tertiary piston lands, said tapered valve stem having first and second angled ramp segments integrally formed at predetermined angles to a longitudinal axis of said valve stem, said first angled ramp segment being formed in the range of 65 to 75 degrees and said second angled ramp segment being formed in the range of 25 to 35 degrees, said fluid redirecting means changing the direction of fluid flow upon ingress of fluid into a valve chamber such that a rebound force is generated by the impact of said fluid with said fluid redirecting means that acts to propel said valve piston in an axial direction.

16. An improved valve body of claim 15 wherein said first and second angled ramp segments are blended with a radius in the range of 0.090 to 0.100 inches.

17. An improved valve body of claim 16 wherein said radius is centered at a predetermined axial distance from an end face of said tertiary piston land, said radius being formed to a predetermined radial dimension.

18. An improved valve body of claim 15 wherein said primary and said secondary piston lands each include a plurality of annular grooves formed therein for retaining transmission fluid to buffer said valve piston against side loading during operation.

19. An improved valve body of claim 18 wherein said primary piston land includes six annular grooves and said secondary piston land includes three annular grooves.

20. An improved valve body of claim 15 wherein said tertiary piston land includes a relief diameter formed thereon at its juncture with said second angled ramp segment to reduce resistance to fluid flow into the second gear fluid circuit.

21. An improved valve body of claim 15 wherein said valve piston is provided with an anodized surface finish in accordance with MIL-A-8625, Type III, Class 2 to reduce surface friction.

* * * * *